Patented July 6, 1943

2,323,594

UNITED STATES PATENT OFFICE 2,323,594

PRODUCTION OF CHLORINE DIOXIDE BY REACTION OF CHLORITES AND ALDEHYDES

Clifford A. Hampel, Niagara Falls, N. Y., assignor to The Mathieson Alkali Works, Inc., New York, N. Y., a corporation of Virginia No Drawing. Application October 29, 1941, Serial No. 417,001

10 Claims. (Cl. 23—152)

My invention relates to improvements in the production of chlorine dioxide. I have discovered that chlorites react with aldehydes, under appropriate conditions, to form chlorine dioxide. The reaction is surprising since aldehydes, normally reducing agents, could not be expected to oxidize chlorites to chlorine dioxide. The reaction cannot be accounted for by assuming that the aldehyde is oxidized, by a part of the chlorite, to the corresponding acid which in turn acts upon another part of the chlorite to form chlorine dioxide since the aldehyde-chlorite reaction will occur in buffered solutions above the pH value at which the acid chlorite reaction occurs. The reaction may involve auto-oxidation of the chlorite induced by the aldehyde or it may be a coupled reaction in which the aldehyde reacts and is reformed. In general, the yields secured suggest that the reaction may be typified by the following equation:

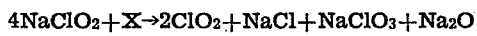

$$4NaClO_2 + X \rightarrow 2ClO_2 + NaCl + NaClO_3 + Na_2O$$

However, I predicate my invention not upon these or any other explanations.

According to my invention, chlorine dioxide is produced by reacting a chlorite with an aldehyde in the presence of water at a pH below about 9. The chlorites useful in carrying out my invention comprise the chlorites of the alkali metals and of the alkaline earth metals. Aldehydes generally are useful in carrying out my invention, including straight-chain aliphatic compounds which may be typified by formaldehyde and acetaldehyde, aromatic aldehydes such as benzaldehyde, the heterocyclic aldehydes such as furfural and the aldoses such as dextrose and d-xylose. Above a pH of about 9, the reaction tends to form chlorates rather than chlorine dioxide, probably through the intermediate formation of chlorine dioxide reacting in the alkaline medium to form chlorite and chlorate. Temperature is not critical, but increasing temperatures increase the reaction rate as would be expected. Concentrations are not critical, but increasing concentrations increase the reaction rate and tend to increase the proportion of chlorite converted to chlorine dioxide. The molar ratio of aldehyde to chlorite is not critical, although the proportion of chlorite reacting decreases if this ratio is below about 0.6: 1. If this ratio exceeds about 0.6:1, all of the chlorite is consumed in the reaction. Proportions of aldehyde exceeding a molar ratio of about 1:1 do not seem to affect the course or rate of the reaction. The reaction can be conducted in aqueous solution, or vaporized aldehyde and water vapor, in a diluent such as air or nitrogen, can be passed through a solid chlorite to produce chlorine dioxide carried from the reaction in the diluent.

The following examples will further illustrate my invention:

*Example I*

One gram of paraformaldehyde and 1 gram of sodium chlorite (98% $NaClO_2$) were added to 100 cc. of water and the solution was heated to 50° C. 0.25 gram of chlorine dioxide was generated.

*Example II*

A solution containing 1.15 grams (0.0127 moles) of sodium chlorite in 145 cc. of water, buffered with a phosphate buffer at a pH of 7.0, was placed in a closed reaction vessel. 0.5 cc. of an aqueous solution of formaldehyde containing 36.6% formaldehyde was added to this chlorite solution. Nitrogen was passed through the combined solution, while maintaining a temperature of 25° C., for 25 minutes. The gas mixture from the reaction vessel was passed through two absorption towers, the first containing an aqueous solution of sodium hydroxide, 10% NaOH, and the second containing an aqueous $CaO_2$ slurry. The chlorine dioxide generated was recovered in the scrubbing towers. 92.8% (0.01175 mole) of the sodium chlorite reacted, 23% being converted to chlorine dioxide, 26% to sodium chlorate and 51% to sodium chloride. Carbon dioxide was formed to the extent of 0.0028 mole.

*Example III*

A solution containing 0.00913 mole of sodium chlorite in 20 cc. of water was charged into a closed reaction vessel connected to two scrubbing towers as in Example II. 0.00875 mole of formaldehyde, as an aqueous 35% formaldehyde solution, was added to the solution in the reaction vessel and air was then passed through the combined solution, while maintaining a temperature of 20° C. for 15 minutes. The pH of the solution at the beginning of the reaction was 7.0 and at the end was 5.2. 99.8% of the chlorite reacted, 40% being converted to chlorine dioxide, 16.5% to sodium chlorate and 43.5% to sodium chloride. Carbon dioxide was formed to the extent of 0.0015 mole.

*Example IV*

One cc. of benzaldehyde was added to 1 gram of sodium chloride in 100 cc. of water, buffered at a pH of 7.0. 0.3 gram of chlorine dioxide was generated at 20° C. At the end of the reaction the benzaldehyde had disappeared as a separate phase and the pH of the solution was 7.

Example V

One cc. of furfural (technical) was added to 3 grams of sodium chlorite in 100 cc. of water and the solution was heated to 60° C. Chlorine dioxide was generated.

Example VI 0.5 gram of dextrose was added to 1 gram of sodium chlorite in 100 cc. of water and the solution was heated to 80° C. Chlorine dioxide was generated.

I claim:

1. In the production of chlorine dioxide, the improvement which comprises reacting a chlorite of a metal of the group consisting of alkali metals and alkaline earth metals with an aldehyde in the presence of water at a pH below about 9.

2. In the production of chlorine dioxide, the improvement which comprises reacting a chlorite of a metal of the group consisting of alkali metals and alkaline earth metals with an aldehyde in the presence of water at a pH below about 9, the molar ratio of alheyde to chlorite being at least 0.6:1.

3. In the production of chlorine dioxide, the improvement which comprises reacting a chlorite of a metal of the group consisting of alkali metals and alkaline earth metals with an aldehyde in aqueous solution at a pH below about 9.

4. In the production of chlorine dioxide, the improvement which comprises reacting a solid chlorite of a metal of the class consisting of the alkali metals and the alkaline earth metals with the vapors of an aldehyde in the presence of water vapor.

5. In the production of chlorine dioxide, the improvement which comprises reacting a chlorite of a metal of the group consisting of alkali metals and alkaline earth metals with an aliphatic aldehyde in the presence of water at a pH below about 9.

6. In the production of chlorine dioxide, the improvement which comprises reacting a chlorite of a metal of the group consisting of alkali metals and alkaline earth metals with formaldehyde in the presence of water at a pH below about 9.

7. In the production of chlorine dioxide, the improvement which comprises reacting a chlorite of a metal of the group consisting of alkali metals and alkaline earth metals with a carbocyclic aldehyde in the presence of water at a pH below about 9.

8. In the production of chlorine dioxide, the improvement which comprises reacting a chlorite of a metal of the group consisting of alkali metals and alkaline earth metals with benzaldehyde in the presence of water at a pH below about 9.

9. In the production of chlorine dioxide, the improvement which comprises reacting a chlorite of a metal of the group consisting of alkali metals and alkaline earth metals with a heterocyclic aldehyde in the presence of water at a pH below about 9.

10. In the production of chlorine dioxide, the improvement which comprises reacting a chlorite of a metal of the group consisting of alkali metals and alkaline earth metals with furfuraldehyde in the presence of water at a pH below about 9.

CLIFFORD A. HAMPEL.